June 28, 1932.  H. D. REYNOLDS  1,864,618
WINDSHIELD WIPER
Filed May 7, 1929
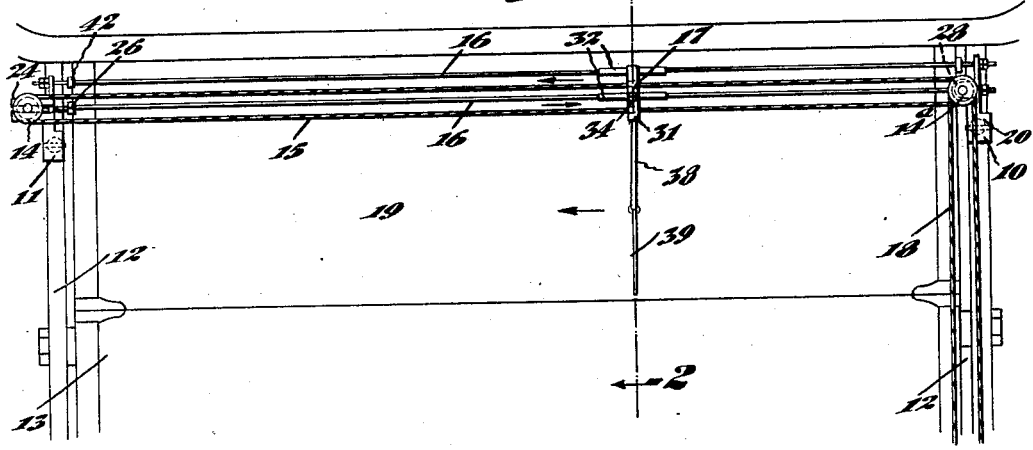
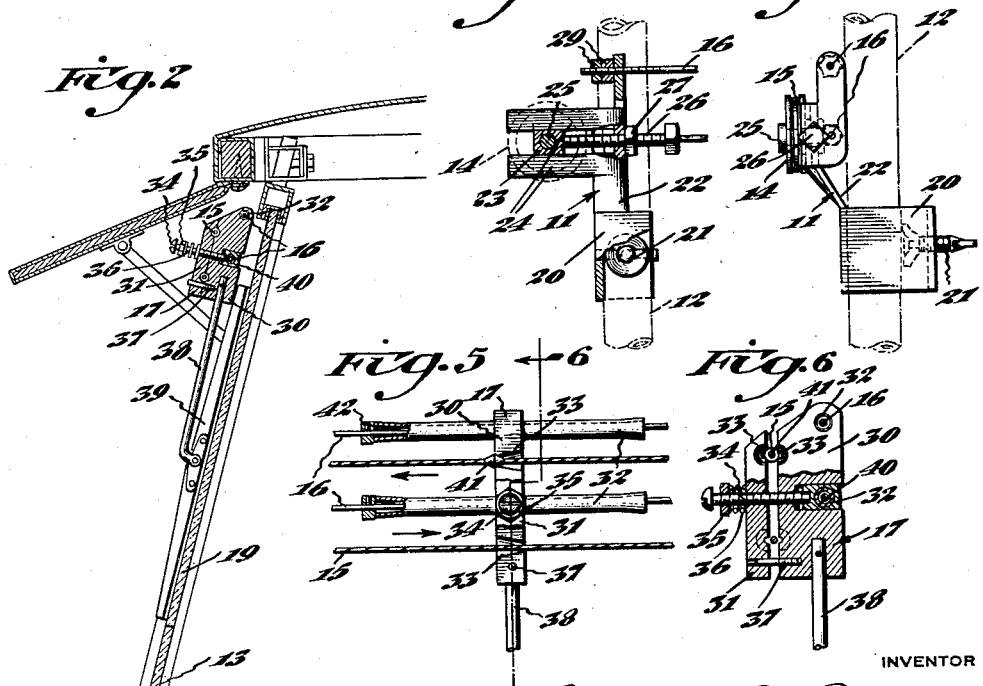
INVENTOR
Hugh D. Reynolds
BY
Work & Work  ATTORNEYS Patented June 28, 1932

1,864,618

UNITED STATES PATENT OFFICE

HUGH D. REYNOLDS, OF CINCINNATI, OHIO, ASSIGNOR OF FORTY-NINE PER CENT TO PETER P. DORNE, OF CINCINNATI, OHIO

WINDSHIELD WIPER

Application filed May 7, 1929. Serial No. 361,231.

This invention relates to improvements in devices for cleaning the glass of windshields or the like, and is particularly directed to a mechanically driven, automatically reversed cleaner means which reciprocates the cleaning blade across the glass.

It is, therefore, an object of this invention to provide a mechanically driven glass cleaning device which moves a wiper in regular strokes across the entire width of the particular sheet of glass and which is of especial utility as placed on an automobile windshield where the snow, rain and sleet are quite detrimental to the transparency of the glass and the clear vision of the driver. Clear vision is an important safety factor and the device of the present invention is designed to automatically clear virtually the entire surface of the glass regularly and in steady strokes.

Another object of this invention is to provide a mechanically actuated cleaning device in which a constant unidirectional drive is converted into two direction movements for a cleaning element for regular reciprocation of the cleaning element across the glass. The device provides forward and return driven lengths of cable to which lengths a wiper is alternately connected for movement, these driving connections controlled by wiper stroke limiting means.

Another object is to provide adjustable means for varying the stroke of the cleaning element and for stopping the stroke and causing automatic reversal of the cleaning element movement.

Another object relates to the mounting for the cleaning element whereby it is slidably mounted for movement across the entire width of glass and is held firmly against the glass, and also to the means for adjusting the pressure of the cleaning element against the glass.

Other objects relate to the attachment of the device to the windshield and to the mechanism for taking up any play developing in the drive.

Further objects and advantages will be more fully set forth in the description of the accompanying drawing, in which:

Figure 1 is a fragmentary front view of an automobile windshield illustrating the cleaning device mounted thereon.

Figure 2 is a sectional view taken on line 2—2, Figure 1, illustrating the traveling block or carrier for the windshield wiping element mounted on its guides and showing the attachment of the cleaning element thereto.

Figure 3 is an enlarged front view of the left-hand bracket for the driving cable idling or return sheave, portions thereof being broken away to show the adjustment means for tightening up the cable and to illustrate the mounting of the guides or slide rods and attachment of the bracket to the windshield post.

Figure 4 is a side elevation of Figure 3.

Figure 5 is an enlarged view, partly in section, illustrating in front view the traveling block, a portion of the front section of the block being broken away to illustrate the disposition of the endless cable relative to the block.

Figure 6 is a sectional view taken on line 6—6, Figure 5, further detailing the traveling block or wiper element carrier.

The reciprocating window cleaning device of the present invention is shown applied to the windshield of an automobile. As shown in Figure 1, it comprises in general, a pair of brackets 10, 11, right and left hand respectively, secured to the posts 12 of the windshield 13, each bracket carrying sheaves 14, 14ª respectively. An endless cable 15 is disposed over and between the respective sheaves and across the face of the windshield. Guide rods 16—16 are provided mounted in and between the brackets and a traveling block or wiper element carrier 17 is slidably mounted on the rods, the endless cable passing through this block both as to the forward and return portions of the cable. Driving connection is made between the cable and block preferably by means of a protuberance on the cable and conical apertures in a yieldable block as will be more fully described hereinafter.

One of the sheaves is a double sheave, namely 14ª, and this sheave has a driving cable 18 disposed over the outside groove thereof. The cable may be driven from any suitable source on the automobile, such as the speedometer shaft, transmission shaft, or an independent driving means if preferred. The windshield illustrated is of the two-piece construction and the wiper element is shown arranged for cleaning the entire upper section 19 thereof.

Describing the brackets in detail, the left-hand bracket 11 will be specifically referred to inasmuch as it incorporates, additionally over the other, an adjustment means for taking up the slack of the endless cable. This bracket 11 comprises a U-shaped portion 20 adapted to encircle the windshield post 12 and having a wing-headed set screw 21 engaged through one arm thereof for engaging the post and an upwardly extending arm 22 in which is mounted the sheave journal 23 and into which are secured the cross or guide rods 16—16.

As shown in Figures 3 and 4, parallel arms or guides 24 vertically spaced apart, extend outwardly parallel with the extent of the cable, and the bearing block 23 is slidably mounted therebetween, this bearing block having grooves in its upper and lower surfaces for engagement with the edges of the guide extensions. The idler or return sheave 14 is journalled in this block on a bolt 25. The bearing block is forced outwardly by means of a set screw 26 secured in the bracket in parallelism with the direction of cable extent, a lock nut 27 being provided for setting this cable tensioning screw in position.

The right-hand bracket is dissimilar to the left-hand bracket merely in that an ear 28 is provided in place of the guide 24 in which the sheave 14ª thereof is journalled on a fixed center. A portion of the upper part of each bracket is disposed at right angles to the cable extent and in these portions are secured the respective ends of the cross or guide rods 16—16, there being two of these rods disposed one above the other. Nuts 29 are provided on the extreme outer ends of the rods which are drawn down against the respective brackets for tightly securing the rods in position.

The guide rods 16—16, as will be apparent from Figures 2 and 6, are disposed slightly in back of the cable. The wiper carrier or traveling block 17, as detailed in Figures 5 and 6, is made in two sections, one of which, namely 30, is directly mounted on the guide rods and the other of which, namely 31, is yieldably urged toward the first. The main section 30, mounted on the guide rods, has a pair of tubes 32—32 traversing it and secured therein, these tubes being of considerable length and traversed by the guide rods 16—16 for providing suitable alignment of the block on the guide rods and preventing tilting or canting of the same relative thereto. The tubes are flared at the outer ends so as not to interfere with the free movement of the block along the guide rods.

The respective sections of the block have registering conical semicircular grooves 33 therein, which, when the sections are placed together, constitute conical bores. The block may, therefore, be said to be split on the common center line of the conical openings. These openings are traversed by the forward and reverse lengths of the endless cable, respectively.

The outer or floating section 31 is urged toward the section mounted on the guide rods by means of a screw 34 passing therethrough and engaged into the main section, and a nut 35 toward the outer or head end of the screw compressing a coil spring 36 against the outer surface of the floating section. The floating section is further guided by means of the engagement of an aperture, toward the lower end thereof, over the end of a stud 37 extending from the adjacent face of the main section. The wiper element depends from this block and comprises a rod 38 pinned to the main section and carrying a wiper blade 39 at its lower end. The rod 38 is pivotally connected to the blade intermediate the length thereof for the purpose of allowing the blade to adjust itself relative to the surface of the glass against which it is engaged. The blade is of any conventional cleaning blade structure, these blades usually comprising a metal carrier portion and a rubber strip.

The pressure of the blade against the glass is adjusted by swinging the block on the upper guide rod. This is accomplished by having the lower tube secured in a block 40 which is slidable laterally in the main section of the block relative to the guide rod. The inner end of the previously described adjusting screw 34 is seated in a depression in the inner face of the block and it is possible, by varying the position of the screw, to swing the block on the upper guide rod and, therefore, the wiper toward and from the glass, using the lower guide rod as the fixed abutment and the screw as the swinging means engaging against the block which is mounted on the lower guide rod. The cable has a bead or protuberance 41 formed or secured thereon, this bead, as illustrated, being of double-cone form, the angle of the conical portions corresponding to the angle of the conical bores through the traveling block.

It will be apparent from Figures 5 and 6 that as the bead 41 on the driven endless carrier comes into the wide end of the upper conical opening, the coil spring tension will act to prevent the sections from spreading, and the protuberance on the cable will move the carrier and wiper across the width of the windshield. Toward the ends of the guide rods, pairs of collars 42—42 are adjustably secured thereon by means of set screws, these collars providing stops engaged by the ends of the tubes on the carrier block. As shown in Figure 5, when this engagement occurs the positive stopping of the block will cause the protuberance to spread the sections and it will pass around the sheave and will enter the wide end of the lower conical bore which is oppositely disposed relative to the upper bore, and the result will be that the protuberance will carry the block on its lower length in reverse stroke and the foregoing reversing function will occur at the other end of the windshield.

Having described my invention, I claim:

1. A device for operating a windshield wiper, comprising, a driven endless cable, means for driving said endless cable, a slidably mounted traveling block adapted to carry the windshield wiper, both forward and return runs of said cable passing through said block, said block formed of sections joined about the cable runs, a protuberance on said cable, means for positively stopping said block at the respective ends of the cable runs, and said block having its traversed portions conically formed in reverse directions for receiving and clutching said protuberance.

2. A device for operating a windshield wiper, comprising, a driven endless cable, an element to be translated and adapted to carry the windshield wiper, said element having reversely formed conical openings respectively traversed by the forward and return runs of said cable, a protuberance on said cable, and means for limiting the movement of said element in the respective directions and breaking the clutch contact of the protuberance within the respective conical bores whereby the protuberance may be drawn through one bore at the limit of movement and engage the other bore for a reverse movement of the element.

3. In an apparatus for operating a windshield wiper, forward and return cable lengths, means for driving said cable lengths, a traveling block, means for slidably mounting said traveling block for movement parallel to said cable lengths, said block adapted to carry a windshield wiper, both of said cable lengths passing through said traveling block, an element on said cable lengths adapted to frictionally engage within the traveling block, and yieldable means in said traveling block adapted to normally cause a unitary movement of said element on said cable lengths and said traveling block, and abutments at the respective ends of the cable lengths for abutment by said traveling block and operation of the yieldable means for disconnection of said element from the traveling block.

4. In an apparatus for operating a windshield wiper, an endless cable, means for mounting said cable, means for driving said cable, a traveling block, said block adapted to carry a windshield wiper, both of the runs of said cable passing through said traveling block, an element on said cable adapted to frictionally engage within the traveling block, and yieldable means in said traveling block adapted to normally cause a unitary movement of said element and said traveling block, and abutments at the respective ends of the cable runs for abutment by said traveling block and operation of the yieldable means for disconnection of said element from said traveling block.

5. In an apparatus for operating a windshield wiper, a driven endless cable, a traveling block, said traveling block adapted to carry a windshield wiper, said traveling block including bores traversed by the respective runs of said cable, an element on said cable adapted to alternately engage within the bores of the traveling block, said traveling block being of yieldable construction whereby the bores may be spread and adapted to normally cause a unitary movement of said element and said traveling block, and abutments at the respective ends of the cable runs for abutment by said traveling block and operation of the yieldable means for disconnection of said element from the traveling block.

6. In an apparatus for operating a windshield wiper, a driven endless cable, a traveling block, rods for slidably mounting said traveling block for movement parallel to the cable runs, said traveling block including tubes mounting the same on said rods, said block adapted to carry a windshield wiper, both of the runs of said cable passing through said traveling block, an element on said cable adapted to frictionally engage within the traveling block, and yieldable means in said traveling block adapted to normally cause a unitary movement of said element and said traveling block, and abutments mounted on said rods at the respective ends of the cable runs for abutment by said traveling block and operation of the yieldable means for disconnection of said element from the traveling block.

7. A device for operating a windshield wiper, comprising, driven cable, a traveling block slidably mounted for movement with the cable and adapted to carry a window cleaning element, said cable traversing said block in both directions, said block composed of yieldable sections joined on the line of traversal by the cable, a protuberance on said cable engaging said block, and stops engageable by said block at either end of its stroke.

In witness whereof, I hereunto subscribe my name.

HUGH D. REYNOLDS.